(12) United States Patent
Ishida et al.

(10) Patent No.: US 7,341,820 B2
(45) Date of Patent: *Mar. 11, 2008

(54) OPTICAL INFORMATION RECORDING MEDIUM

(75) Inventors: Toshio Ishida, Kanagawa (JP); Takeshi Kakuta, Kanagawa (JP); Shinji Saito, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/305,976

(22) Filed: Nov. 29, 2002

(65) Prior Publication Data

US 2003/0118938 A1   Jun. 26, 2003

(30) Foreign Application Priority Data

Nov. 30, 2001  (JP)  ............................. 2001-366191

(51) Int. Cl.
G11B 7/24   (2006.01)

(52) U.S. Cl. ........................... 430/270.15; 430/270.16; 430/945; 428/64.8; 369/275.5

(58) Field of Classification Search ........... 430/270.15, 430/277.1, 945; 428/64.6; 369/275.5
See application file for complete search history.

(56) References Cited

U.S. PATENT DOCUMENTS

| | | | |
|---|---|---|---|
| 4,412,231 A | 10/1983 | Namba et al. | |
| 4,458,004 A * | 7/1984 | Tanikawa | ............... 430/270.16 |
| 4,465,767 A | 8/1984 | Oba et al. | |
| 4,737,444 A * | 4/1988 | Satoh et al. | ........... 430/270.18 |
| 4,871,408 A | 10/1989 | Honoma et al. | |
| 5,075,145 A | 12/1991 | Yamamoto et al. | |
| 5,332,608 A * | 7/1994 | Tsuji et al. | ................. 428/64.8 |
| 5,340,698 A | 8/1994 | Hirata et al. | |
| 5,490,131 A * | 2/1996 | Ohta et al. | ............... 369/275.5 |
| 5,747,413 A | 5/1998 | Amano et al. | |
| 5,763,868 A | 6/1998 | Kubota et al. | |
| 5,798,161 A | 8/1998 | Kita et al. | |
| 5,806,388 A | 9/1998 | Imataki | |
| 5,882,760 A * | 3/1999 | Hatwar et al. | .............. 428/64.1 |
| 5,962,181 A | 10/1999 | Daems et al. | |
| 5,965,229 A | 10/1999 | Zhou et al. | |
| 5,968,708 A * | 10/1999 | Yashiro et al. | ........... 430/270.1 |
| 6,023,451 A | 2/2000 | Kashiwagi et al. | |
| 6,051,289 A | 4/2000 | Tsujimoto et al. | |
| 6,136,751 A | 10/2000 | Harada | |
| 6,228,455 B1 | 5/2001 | Huang et al. | |
| 6,246,656 B1 * | 6/2001 | Kawakubo et al. | .... 369/112.23 |
| 6,269,072 B1 | 7/2001 | Ohgo | |
| 6,353,592 B1 | 3/2002 | Kashiwagi et al. | |
| 6,506,469 B2 | 1/2003 | Takahashi et al. | |
| 6,572,947 B2 * | 6/2003 | Sabi et al. | ................. 428/64.4 |
| 6,576,320 B2 | 6/2003 | Hayashida et al. | |
| 6,627,288 B1 | 9/2003 | Ogiso et al. | |
| 6,661,770 B2 * | 12/2003 | Kakuta et al. | ........... 369/275.4 |
| 6,699,591 B2 | 3/2004 | Ishida et al. | |
| 6,731,592 B2 * | 5/2004 | Usami | ........................ 369/286 |
| 6,767,987 B2 | 7/2004 | Okazaki | |
| 6,808,782 B2 * | 10/2004 | Usami et al. | ............... 428/64.1 |
| 6,811,850 B1 | 11/2004 | Hirata | |
| 6,844,043 B2 | 1/2005 | Higuchi | |
| 6,887,548 B2 * | 5/2005 | Shibata | ....................... 428/65.2 |
| 6,969,764 B2 * | 11/2005 | Ogiso et al. | ................. 540/145 |
| 2001/0044002 A1 | 11/2001 | Shingai et al. | |
| 2002/0044523 A1 | 4/2002 | Oshima et al. | |
| 2002/0076648 A1 * | 6/2002 | Berneth et al. | ......... 430/270.17 |
| 2002/0122379 A1 | 9/2002 | Tamada et al. | |
| 2002/0145967 A1 | 10/2002 | Fujii et al. | |
| 2003/0003261 A1 * | 1/2003 | Saito et al. | ................. 428/64.4 |
| 2003/0017295 A1 | 1/2003 | Ishida et al. | |
| 2003/0031954 A1 | 2/2003 | Kanuta et al. | |
| 2003/0081537 A1 | 5/2003 | Shinotsuka | |
| 2003/0082331 A1 * | 5/2003 | Ishida et al. | ............... 428/64.4 |
| 2003/0090990 A1 | 5/2003 | Ozawa et al. | |
| 2003/0116266 A1 | 6/2003 | Kitano et al. | |
| 2003/0118938 A1 | 6/2003 | Ishida et al. | |
| 2003/0148215 A1 * | 8/2003 | Kakuta et al. | .......... 430/270.15 |
| 2003/0183511 A1 | 10/2003 | Kakuta et al. | |
| 2004/0125739 A1 * | 7/2004 | Usami et al. | ............. 369/275.5 |

FOREIGN PATENT DOCUMENTS

| | | |
|---|---|---|
| EP | 0 653 685 A1 | 5/1995 |
| EP | 0 837 459 A1 | 4/1998 |
| EP | 0 871 164 A2 | 10/1998 |

(Continued)

OTHER PUBLICATIONS

Machine translation of JP 2001-155383.*

(Continued)

*Primary Examiner*—Martin Angebranndt
(74) *Attorney, Agent, or Firm*—Sughrue Mion, PLLC

(57) ABSTRACT

The present invention is an optical information recording medium comprising a substrate having disposed in an order thereon a recording layer, an interlayer, and a cover layer, wherein recording and reproduction are carried out by the irradiation with a laser light having a wavelength in the range of 380 to 500 nm through a lens having a lens numerical aperture NA of 0.7 or more, wherein the recording layer is a layer of an organic substance and the thickness of the interlayer is within a range of 1 nm to 9 nm.

16 Claims, No Drawings

FOREIGN PATENT DOCUMENTS

| | | | |
|---|---|---|---|
| EP | 1 017 045 A1 | | 7/2000 |
| EP | 1 047 055 A1 | | 10/2000 |
| EP | 1 065 663 A2 | | 1/2001 |
| EP | 1 083 555 A | | 3/2001 |
| EP | 1 103 962 A | | 5/2001 |
| EP | 1 154 413 A2 | | 11/2001 |
| EP | 1191525 | * | 3/2002 |
| EP | 1 271 499 A2 | | 1/2003 |
| JP | 60-204395 | * | 10/1985 |
| JP | 02-196689 | * | 8/1990 |
| JP | 4-64936 A | | 2/1992 |
| JP | 06-044608 | * | 2/1994 |
| JP | 7-266703 A | | 10/1995 |
| JP | 8-45125 A | | 2/1996 |
| JP | 08-279182 | * | 10/1996 |
| JP | 09-147418 A | | 6/1997 |
| JP | 11-31337 A | | 2/1999 |
| JP | 11-120617 A | | 4/1999 |
| JP | 11-138993 | * | 5/1999 |
| JP | 2000-067468 A | | 3/2000 |
| JP | 2000-285520 A | | 10/2000 |
| JP | 2000-311392 A | | 11/2000 |
| JP | 2001-043566 | | 2/2001 |
| JP | 2001-155383 | | 6/2001 |
| JP | 2001-243658 A | | 9/2001 |
| JP | 2001-287465 A | | 10/2001 |
| WO | 01/47719 | * | 7/2001 |
| WO | WO 02/054399 A1 | | 7/2002 |

OTHER PUBLICATIONS

Partial translation of JP 60-204395 (translation of pp. 12, 13, 90-96 of the reference), (3 pages).*

Keep Schep et al., ISOM 2000, International Symposium on Optical Memory 2000, c/o Business Center for Academic Societies Japan, Technical Digest.

Patent Abstracts of Japan, vol. 018, No. 278 (P-1743), May 26, 1994 & JP 06 044608A, Feb. 18, 1994 Abstract.

Japanese Office Action dated Dec. 19, 2006 with English translation.

* cited by examiner

OPTICAL INFORMATION RECORDING MEDIUM

BACKGROUND OF THE INVENTION

1. Field of the Invention

The present invention relates to an optical information recording medium and more particularly relates to an optical information recording medium that is additionally recordable by heat mode.

2. Description of the Related Art

Heretofore, an optical information recording medium (optical disc) capable of one time-only recording by laser light is known. This optical disc is also called an additionally recordable CD (so-called CD-R). A typical construction of the optical disc comprises a transparent discoid substrate having thereon a recording layer comprising an organic dye, a reflective layer comprising a metal such as gold, and a protective layer (cover layer) comprising a resin, in the order listed. Recording of information on the CD-R is performed by irradiation with laser light in a near-infrared region (usually laser light having a wavelength of about 780 nm). The irradiated portion of the recording layer absorbs the light and the temperature rises locally. The rise in the temperature causes a change in a physical or chemical property of the irradiated portion (such as pit formation) and thus brings about a change in optical properties of the irradiated portion. As a result, the information is recorded, on the other hand, reading (reproduction) of the information is also carried out by irradiation of the CD-R with laser light having the same wavelength as that of the laser light for recording and is based on detection of difference in reflectance between a portion of the recording layer (recorded portion) whose optical properties have changed and a portion of the recording layer (unrecorded portion) whose optical properties have not changed.

In recent years, there is a demand for an optical information recording medium that enables information recording in a higher density. In order to meet such a demand, an optical disc, which is called an additionally recordable digital versatile disk (so-called DVD-R), has been proposed (for example, "Nikkei New Media" extra issue "DVD" in 1995). The DVD-R comprises two disks, each including a transparent discoid substrate which has pregrooves formed thereon pregrooves for tracking laser light for irradiation having a narrow groove width (0.74 to 0.8 μm), i.e., equal to or less than half of that for CD-R, and further has disposed thereon a recording layer usually containing an organic dye, a reflective layer, and a protective layer, laminated in the order listed. The disks are adhered to each other such that the recording layers face inwardly. Alternatively, the DVD-R comprise a disk having the above-described construction and a discoid protective substrate of the same shape, in which the disk and the discoid protective substrate are adhered to each other such that the recording layer faces inwardly. In this DVD-R, recording and reproduction of information are performed by irradiating visible laser light (usually a laser in a wavelength region ranging from 630 to 680 nm). Accordingly, higher density information recording is possible in comparison with CD-R.

Recently, networks, such as the Internet, and high-vision TV are rapidly coming into wide use. In addition, televising of HDTV (High Definition Television) will start soon. In such a situation, a need exists for a large-capacity recording medium that enables recording of image information in an inexpensive and simple way. Although DVD-R presently fills the role of a large-capacity recording medium, in view of the increasing demand for larger capacity and higher density, the development of a recording medium capable of fulfilling such demand is also necessary. Because of this, the development of a larger-capacity recording medium, which enables recording at a higher density with light having a shorter wavelength than that used in DVD-R, is under way.

For example, Japanese Patent Application Laid-Open (JP-A) Nos.4-74690, 7-304256, 7-304257, 8-127174, 11-53758, 11-334204, 11-334205, 11-334206, 11-334207, 2000-43423, 2000-108513, 2000-113504, 2000-149320, 2000-158818, and 2000-228028 disclose recording and reproducing methods, in which recording and reproduction of information are carried out in an optical information recording medium, which has a recording layer containing an organic dye, by irradiating the recording medium with laser light having a wavelength of 530 nm or less from a recording layer side thereof toward a reflective layer side thereof. According to these methods, recording and reproduction of information are carried out by irradiating an optical disc, which has a recording layer containing a compound, such as porphyrin compound, an azo-based dye, a metal azo-based dye, a quinophthalone-based dye, a trimethinecyanine dye, a dicyanovinylphenyl-skeletal dye, a coumarin compound, a naphthalocyanine compound, or the like, with laser light having a blue color (wavelength: 430 nm, 488 nm) or with laser light having a blue-green color (wavelength: 515 nm).

Meanwhile, an optical disc based on phase transition is known among DVD's. According to this DVD, an alloy layer such as GeSbTe is used as a recording layer, and the recording layer is instantly heated by laser light to cause a phase transition from a crystalline state to an amorphous state so that recording and reproduction are carried out utilizing a change in reflectance changeable in accordance with the phase transition. Recently, a DVD system, in which recording and reproduction are carried out utilizing this phase-transition type DVD by a blue-purple laser, was made public ("ISOM2000" pp. 210 to 211). The task of achieving a high density was fulfilled to some extent by this system.

The optical information recording media described above have been associated with a in problem that, if the recording layer comprises an organic substance and a cover layer is to be adhered using an adhesive, the adhesive dissolved the organic substance constituting the recording layer. Although this problem can be solved by interposing an interlayer between the recording layer and the cover layer, a new problem emerges in that, if a thickness of the interlayer is large, the interlayer brings about a reduction in reflectance.

SUMMARY OF THE INVENTION

The present invention was made in view of the problems associated with prior art, and the task of the invention is to achieve the following object.

The object of the invention in to provide an optical recording medium having a high reflectance, a large carrier/noise ratio (C/N), and stable recording and reproduction characteristics.

The means for solving the problems is as follows.

That is, there is provided an optical information recording medium comprising a substrate having disposed thereon in the following order a recording layer, an interlayer, and a cover layer, wherein recording on and reproduction from the optical information recording medium are carried out by irradiation with a laser light having a wavelength in the range of 380 to 500 nm through a lens having a lens numerical aperture NA of at least 0.7, the recording layer includes a layer of an organic substance and the thickness of the interlayer is from 1 to 9 nm.

It is preferable that the interlayer is made of a dielectric material and the organic substance comprises at least one of a benzotriazole derivative and a phthalocyanine derivative.

Further, it is preferable that the organic substance is the phthalocyanine derivative, a refracting rate of the recording layer to a recording laser light wavelength (n) is at least 1.8 and less than 1.9, the dielectric material comprises at least one of sulfides and oxides, and a thickness of the interlayer is within the range of 1 to 5 nm.

DETAILED DESCRIPTION OF THE PREFERRED EMBODIMENTS

The embodiments of the optical information recording medium of the present invention will now be explained below. The optical information recording medium of the invention comprises a substrate having, disposed in an order thereon a recording layer, an interlayer, and a cover layer, in which recording and reproduction are carried out by the irradiation with a laser light having a wavelength in the range of 380 to 500 nm through a lens having a lens numerical aperture NA of 0.7 or more, in which the recording layer is a layer of an organic substance and the thickness of the interlayer is within a range of 1 nm to 9 nm. Each layer of an embodiment including a reflective layer is interposed between the substrate and the recording layer, will be explained below.

Substrate:

Any material, which has been used as a substrate material of a conventional optical information recording medium, may be selected arbitrarily and used as the substrate of the invention.

Specific examples of the substrate material include glass; acrylic resins such as polycarbonate, polymethyl methacrylate; vinyl chloride-based resins such as polyvinyl chloride and copolymers of vinyl chloride; epoxy resins; amorphous polyolefins; polyesters; and metals such as aluminum. If necessary, these materials may be used in combinations.

Among the materials listed above, polycarbonate and amorphous polyolefins are preferable from the standpoint of moisture resistance, dimension stability, and costs. Polycarbonate is particularly preferable. It is preferable that the thickness of the substrate is 0.5 to 1.4 mm.

Guide grooves for tracking or concavities and convexities (pregrooves) representing such information as address signals are formed on the substrate. In order to obtain a higher recording density, it is preferable to use a substrate whose pregrooves have a narrower track pitch relative to CD-R or DVD-R. The track pitches of the pregrooves are 300 to 600 nm and the depths of the pregrooves (groove depths) are in the range of 40 to 150 nm.

Further, on the substrate surface of the side that is to have a reflective layer described later, an undercoat layer in preferably provided for such purposes as improvement of planarity and improvement of adhesion.

Examples of the material for the undercoat layer include polymeric substances such as polymethyl methacrylate, acrylic acid/methacrylic acid copolymers, styrene/maleic anhydride copolymers, polyvinyl alcohol, N-methylolacrylamide, styrene/vinyltoluene copolymers, chlorosulfonated polyethylene, nitrocellulose, polyvinyl chloride, chlorinated polyolefin, polyester, polyimide, vinyl acetate/vinyl chloride copolymers, ethylene/vinyl acetate copolymers, polyethylene, polypropylene, polycarbonate, and others; and surface-modifying agents such as silane coupling agents.

The undercoat layer can be formed by preparing a coating liquid by dissolving or dispersing the above-mentioned material in a suitable solvent, and applying the coating liquid to the substrate surface by a method such as spin coating, dip coating, extrusion coating, or the like. The thickness of the undercoat layer is normally in the range of 0.005 to 20 μm and preferably in the range of 0.01 to 10 μm.

Reflective Layer:

A light-reflective substance having a high reflectance to a laser light is used in the reflective layer. The reflectance is 70% or more.

Examples of the light-reflective substance having a high reflectance include metals and semimetals such as Mg, Se, Y, Ti, Zr, Hf, V, Nb, Ta, Cr, Mo, W, MH, Re, Fe, Co, Ni, Ru, Rh, Pd, Ir, Pt, Cu, Ag, Au, Zn, Cd, Al, Ga, In, Si, Ge, Te, Pb, Po, Sn, and Bi, and stainless steel. These light-reflective substances may be used singly or in combinations of two or more, or alternatively as alloys. Among these substances, Cr, Ni, Pt, Cu, Ag, Au, Al, and stainless steel are preferable. Au, Ag, Al, and alloys thereof are more preferable. Au, Ag, and alloys thereof are most preferable.

The reflective layer can be formed by, for example, vacuum-deposition, sputtering, or ion-plating of the above-mentioned light-reflective substance on the substrate. The layer thickness of the reflective layer is normally within the range of 10 to 300 nm and preferably within the range of 50 to 200 nm.

The reflective layer is not always necessary if the reflectance of the recording layer that will be described later is sufficiently large.

Recording Layer:

The recording layer is formed on the reflective layer. The recording layer is a layer which is made of an organic substance and enables the recording and reproduction of information by a laser light having a wavelength in the range of 380 to 500 nm through a lens having a lens numerical aperture NA of 0.7 or more. The refracting rate of the recording layer to the recording laser light wavelength (n) is preferably at least 1.8 and less than 1.9, more preferably within the range of $1.8<n<1.89$, and even more preferably within the range of $1.85<n<1.89$.

The organic substance is a triazole-based compound, a phthalocyanine derivative, a porphyrin-based compound, an aminobutadiene-based compound, a cyanine-based compound, or the like, and is preferably at least one of these compounds. The phthalocyanine derivative is preferably at least one of an alkoxy-substituted compound, a sulfonamide-substituted compound, a sulfamoyl-substituted compound, and a sulfonic acid-substituted compound.

The organic substance may be used together with a dye described in JP-A Nos.4-74690, 8-127174, 11-53758, 11-334204, 11-334205, 11-334206, 11-334207, 2000-43423, 2000-108513, 2000-158818, etc.

Further, without being limited to these dyes, also advantageously used are organic substances such as a triazole compound, a triazine compound, a cyanine compound, a merocyanine compound, an aminobutadiene compound, a phthalocyanine derivative, a cinnamic acid compound, a viologen compound, an azo compound, an oxonolbenzoxazole compound, a benzotriazole derivative, etc. Among these compounds, a benzotriazole derivative and a phthalocyanine derivative are particularly preferable.

As the phthalocyanine derivatives described above, it is preferable to use the phthalocyanine derivative represented by general formula (1).

General formula (1)

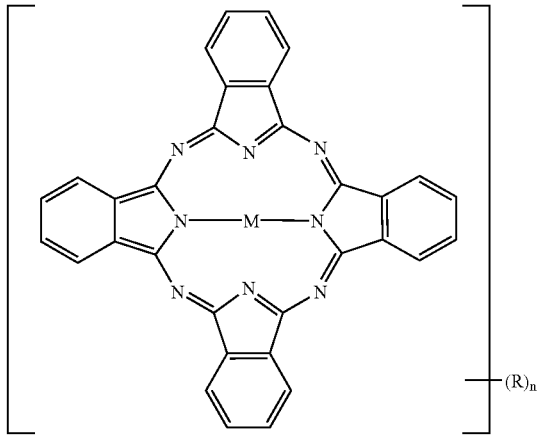

wherein R represents a substituent; n represents an integer from 1 to 8, wherein when n is 2 or more plurality of R may be same or different; M represents two hydrogen atoms, a divalent- to tetravalent-metal, a divalent- to tetravalent-metal oxide, or a divalent- to tetravalent-metal having a ligand.

Among the phthalocyanine derivatives represented by general formula (1), it is preferable to use the phthalocyanine derivative represented by general formula (2).

General formula (2)

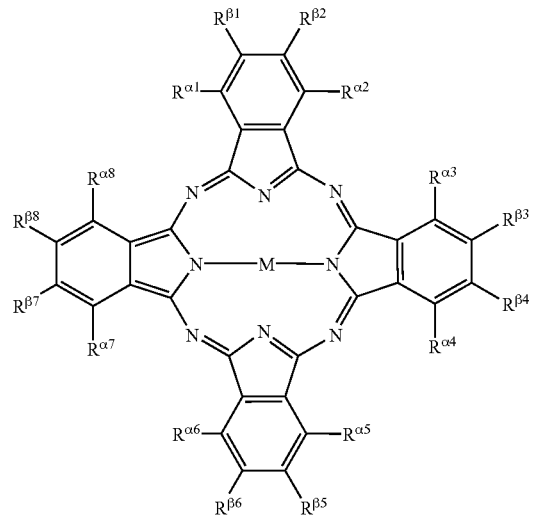

wherein $R^{\alpha 1}$ to $R^{\alpha 8}$ and $R^{\beta 1}$ to $R^{\beta 8}$ each independently represents one selected from the group consisting of a hydrogen atom, a halogen atom, a cyano group, a nitro group, a formyl group, a carboxyl group, a sulfo group, an alkyl group having 1 to 20 carbon atoms which may be substituted or unsubstituted, an aryl group having 6 to 14 carbon atoms which may be substituted or unsubstituted, a heterocyclic group having 1 to 10 carbon atoms which may be substituted or unsubstituted, an alkoxy group having 1 to 20 carbon atoms which may be substituted or unsubstituted, an aryloxy group having 6 to 14 carbon atoms which may be substituted or unsubstituted, an acyl group having 2 to 21 carbon atoms which may be substituted or unsubstituted, an alkylsulfonyl group having 1 to 20 carbon atoms which may be substituted or unsubstituted, an arylsulfonyl group having 6 to 14 carbon atoms which may be substituted or unsubstituted, a heterylsulfonyl group having 1 to 10 carbon atoms which may be substituted or unsubstituted, a carbamoyl group having 1 to 25 carbon atoms which may be substituted or unsubstituted, a sulfamoyl group having 0 to 32 carbon atoms which may be substituted or unsubstituted, an alkoxycarbonyl group having 2 to 20 carbon atoms which may be substituted or unsubstituted, an aryloxycarbonyl group having 7 to 15 carbon atoms which may be substituted or unsubstituted, an acylamino group having 2 to 21 carbon atoms which may be substituted or unsubstituted, a sulfonylamino group having 1 to 20 carbon atoms which may be substituted or unsubstituted. In general formula (2), all of $R^{\alpha 1}$ to $R^{\alpha 8}$ are not simultaneously hydrogen atoms. M represents two hydrogen atoms, a divalent- to tetravalent-metal, a divalent- to tetravalent-metal oxide, or a divalent- to tetravalent-metal having a ligand; further, at least eight of the substituents of $R^{\alpha 1}$ to $R^{\alpha 8}$ and $R^{\beta 1}$ to $R^{\beta 8}$ are hydrogen atoms.

Preferably, in general formula (2), $R^{\alpha 1}$ to $R^{\alpha 8}$ and $R^{\beta 1}$ to $R^{\beta 8}$ each independently represents one selected from the group consisting of a hydrogen atom, a halogen atom, a carboxyl group, a sulfo group, an alkyl group having 1 to 20 carbon atoms (for example, a methyl group, an ethyl group, n-propyl group, or a i-propyl group) which may be substituted or unsubstituted, an aryl group having 6 to 14 carbon atoms (for example, a phenyl group, a p-methoxyphenyl group, or a p-octadecylphenyl group) which may be substituted or unsubstituted, an alkoxy group having 1 to 16 carbon atoms (for example, a methoxy group, an ethoxy group, or an n-octyloxy group) which may be substituted or unsubstituted, an aryloxy group having 6 to 14 carbon atoms atoms (for example, a phenoxy group or a p-ethoxyphenoxy group) which may be substituted or unsubstituted, an alkylsulfonyl group having 1 to 20 carbon atoms (for example, a methanesulfonyl group, an n-propylsulfonyl group, or a butanesulfonyl group) which may be substituted or unsubstituted, an arylsulfonyl group having 6 to 14 carbon atoms (for example, a toluene sulfonyl group or a benzenesulfonyl group) which may be substituted or unsubstituted, a sulfamoyl group having 0 to 20 carbon atoms (for example, a methyl sulfamoyl group or an n-butylsulfamoyl group) which may be substituted or unsubstituted, an alkoxycarbonyl group having 1 to 17 carbon atoms (for example, a methoxy carbonyl group or an n-butoxycarbamoyl group) which may be substituted or unsubstituted, an aryloxycarbonyl group having 7 to 15 carbon atoms (for example, a phenoxycarbonyl group or an m-chlorophenylcarbonyl group) which may be substituted or unsubstituted, an acylamino group having 2 to 21 carbon atoms (for example, an acetylamino group, a pyvaloylamino group, or an n-hexylamino group) which may be substituted or unsubstituted, a sulfonylamino group having 1 to 18 carbon atoms (for example, a methanesulfonylamino group or an n-buthanesulfonylamino group) which may be substituted or unsubstituted.

In general formula (I), more preferable examples of $R^{\alpha 1}$ to $R^{\alpha 8}$ and $R^{\beta 1}$ to $R^{\beta 8}$ are a hydrogen atom, a halogen atom, a carboxyl group, a sulfo group, an alkyl group having 1 to 16 carbon atoms which may be substituted or unsubstituted, an alkoxy group having 1 to 16 carbon atoms which may be substituted or unsubstituted, an alkylsulfonyl group having 1 to 20 carbon atoms which may be substituted or unsubstituted, an arylsulfonyl group having 6 to 14 carbon atoms which may be substituted or unsubstituted, a sulfamoyl group having 2 to 20 carbon atoms which may be substituted or unsubstituted, an alkoxycarbonyl group having 1 to 13 carbon atoms which may be substituted or unsubstituted, an acylamino group having 2 to 21 carbon atoms which may be substituted or unsubstituted, and a sulfonylamino group having 1 to 18 carbon atoms. Even more preferable examples of $R^{\alpha 1}$ to $R^{\alpha 8}$ are a hydrogen atom, a halogen atom, a sulfo group, an alkoxy group having 1 to 16 carbon atoms which may be substituted or unsubstituted, an alkylsulfonyl group having 1 to 20 carbon atoms, an arylsulfonyl group having 6 to 14 carbon atoms which may be substituted or unsubstituted, a sulfamoyl group having 2 to 20 carbon atoms which may be substituted or unsubstituted, an acylamino group having 2 to 12 carbon atoms which may be substituted or unsubstituted, and a sulfonylamino group having 1 to 18 carbon atoms which may be substituted or unsubstituted, with $R^{\beta 1}$ to $R^{\beta 8}$ being $R^{\beta 1}$ a hydrogen atom or a halogen atom. Even more preferable examples of $R^{\alpha 1}$ to $R^{\alpha 8}$ are a hydrogen atom, a sulfo group, an alkylsulfonyl group having 1 to 20 carbon atoms which may be substituted or unsubstituted, an arylsulfonyl group having 6 to 14 carbon atoms which may be substituted or unsubstituted, and an arylsulfonyl group having 7 to 20 carbon atoms which may be substituted or unsubstituted, with $R^{\beta 1}$ to $R^{\beta 8}$ being a hydrogen atom.

Preferably, in general formula (2), four substituents (namely, one of $R^{\alpha 1}$ and $R^{\alpha 2}$, one of $R^{\alpha 3}$ and $R^{\alpha 4}$, one of $R^{\alpha 5}$ and $R^{\alpha 6}$, and one of $R^{\alpha 7}$ and $R^{\alpha 8}$) are not simultaneously hydrogen atoms.

In general formula (2), $R^{\alpha 1}$ to $R^{\alpha 8}$ and $R^{\beta 1}$ to $R^{\beta 8}$ each may have a substituent. Examples of the substituent include a chain or cyclic alkyl group having 1 to 20 carbon atoms which may be substituted or unsubstituted (for example, a methyl group, an ethyl group, an isopropyl group a cyclohexyl group, a benzyl group, or a phenetyl group), an aryl group having 6 to 18 carbon atoms (for example, a phenyl group, a chlorophenyl group, a 2,4-di-t-amylphenyl group, or a 1-naphthyl group), an alkenyl group having 2 to 20 carbon atoms (for example, a vinyl group or a 2-methylvinyl group), an alkynyl group having 2 to 20 carbon atoms (for example, an ethynyl group, a 2-methylethynyl group, a 2-phenylethynyl group), a halogen atom (for example, F, Cl, Br, I), a cyano group, a hydroxyl group, a carboxyl group, an acyl group having 2 to 20 carbon atoms (for example, an acetyl group, a benzoyl group, a salicyloyl group or a pivaloyl group), an alkoxy group having 1 to 20 carbon atoms (for example, a methoxy group, a butoxy group, or a cyclohexyloxy group), an aryloxy group having 6 to 20 carbon atoms (for example, a phenoxy group, a 1-naphthoxy group, or a p-methoxyphenoxy group), an alkylthio group having 1 to 20 carbon atoms (for example, a methylthio group, a butylthio group, a benzylthio group, or a 3-methoxypropylthio group), an arylthio group having 6 to 20 carbon atoms (for example a phenylthio group or a 4-chlorophenylthio group), an alkylsulfonyl group having 1 to 20 carbon atoms (for example, a methanesulfonyl group or a butanesulfonyl group), an arylsulfonyl group having 6 to 20 carbon atoms (for example, a benzenesulfonyl group or a paratoluene sulfonyl group), a carbamoyl group having 1 to 17 carbon atoms (for example, an unsubstituted carbamoyl group, a methyl carbamoyl group, an ethyl carbamoyl group, an n-butyl carbamoyl group, or a dimethyl carbamoyl group), an acylamino group having 1 to 16 carbon atoms (for example, an acetylamino group or a benzoylmino group), an acyloxy group having 2 to 10 carbon atoms (for example, an acetoxy group or a benzoyloxy group), an alkoxycarbonyl group having 2 to 10 carbon atoms (for example, a methoxy carbonyl group or an ethoxy carbonyl group), a five- or six-membered heterocyclic group (for example, an aromatic heterocyclic group such as a pyridyl group, a thienyl group, a furyl group, a thiazolyl group, an imidazolyl group, or a pyrazolyl group; or a heterocyclic group such as a pyrrolidinyl group, a piperidinyl group, a morpholino group, a pyranyl group, a thiopyranyl group, a dioxanyl group, or a dithiolanyl group).

In general formula (2), preferable examples of the substituent in $R^{\alpha 1}$ to $R^{\alpha 8}$ and $R^{\beta 1}$ to $R^{\beta 8}$ are a chain or cyclic alkyl group having 1 to 16 carbon atoms which may be substituted or unsubstituted, an aryl group having 6 to 14 carbon atoms, an alkoxy group having 1 to 16 carbon atoms, an aryloxy group having 6 to 14 carbon atoms, a halogen atom, an alkoxycarbonyl group having 2 to 17 carbon atoms, a carbamoyl group having 1 to 10 carbon atoms, and an acylamino group having 1 to 10 carbon atoms. More preferable examples are a chain or cyclic alkyl group having 1 to 10 carbon atoms which may be substituted or unsubstituted, an aryl group having 6 to 10 carbon atoms, an alkoxy group having 1 to 10 carbon atoms, an aryloxy group having 6 to 10 carbon atoms, chlorine atom, an alkoxycarbonyl group having 2 to 11 carbon atoms, a carbamoyl group having 1 to 7 carbon atoms, and an acylamino group having 1 to 8 carbon atoms.

Particularly preferable examples are a branched chain or cyclic alkyl group having 1 to 8 carbon atoms which may be substituted or unsubstituted, an alkoxy group having 1 to 8 carbon atoms, an alkoxycarbonyl group having 3 to 9 carbon atoms, a phenyl group, and a chlorine atom. The most preferable example is an alkoxy group having 1 to 6 carbon atoms.

In general formula (2), M is preferably divalent- to tetravalent-metal, more preferably copper, nickel, or palladium, even more preferably copper or nickel, and most preferably copper.

The compounds represented by general formulae (1) or (2) may be bonded at any positions to form a polymer. In this case, each unit may be the same or mutually different, or may bond to a polymer chain such as polystyrene, polymethacrylate, polyvinyl alcohol, or cellulose.

The phthalocyanine derivative represented by general formulas (1) or (2) and used in the medium of the invention may be a specific derivative used singly or a mixture of several derivatives having different structures. In order to prevent crystallization of the recording layer, it is preferable to use a mixture of isomers whose substituents have different substitution positions.

While specifically preferable examples of the phthalocyanine derivative used in the invention are shown below, the present invention is not limited to these examples.

In Tables 1 to 4, $R^x/R^y$ (each of x and y represents either one of $\alpha 1$ to $\beta 1$ or to $\beta 8$) means either one of $R^x$ or $R^y$. Accordingly, compounds indicated thereby are mixtures of substitution position isomers. In the case of unsubstituted compounds, i.e. the compounds substitute hydrogen atoms, the representation is omitted.

TABLE 1

| No. | Substitution Positions and Substituents | M |
|---|---|---|
| (I-1) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$-$SO_2N(C_5H_{11}$-i$)_2$ | Cu |
| (I-2) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$-$SO_2NH(2$-s-butoxy-5-t-amylphenyl) | Cu |
| (I-3) | $R^{\alpha 1}/R^{\alpha 2}, R^{\alpha 3}/R^{\alpha 4}, R^{\alpha 5}/R^{\alpha 6}$-$SO_2NH(CH_2)_3O(2,4$-di-t-amyl-phenyl) $R^{\alpha 7}/R^{\alpha 8}$-$SO_2H$ | Cu |
| (I-4) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$-$SO_2N(3$-methoxypropyl$)_2$ | Ni |
| (I-5) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$-$SO_2NMe$(cyclohexyl) | Ni |
| (I-6) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$-$SO_2N(3$-i-propoxyphenyl$)_2$ | Ni |
| (I-7) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$-$SO_2NH(2$-i-amyloxy-carbonylphenyl) | Pd |
| (I-8) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$-$SO_2NH(2,4,6$-trimethyl-phenyl) | Pd |
| (I-9) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$-$SO_2(4$-morpholino) | Co |
| (I-10) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$-$SO_2N(C_2H_5)(4$-fluorophenyl) | Fe |
| (I-11) | $R^{\alpha 1}/R^{\alpha 2}, R^{\alpha 3}/R^{\alpha 4}, R^{\alpha 5}/R^{\alpha 6}$-$SO_2NH(CH_2)_3N(C_2H_5)_2$ | Cu |
| (I-12) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$-$SO_2(2$-n-propoxyphenyl) | Cu |
| (I-13) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$-$SO_2(2$-n-butoxy-5-t-butyl-phenyl) | Ni |
| (I-14) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$-$SO_2(2$-methoxycarbonyl-phenyl) | Co |

TABLE 2

| No. | Substitution Positions and Substituents | M |
|---|---|---|
| (I-15) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$-$SO_2(CH_2)_4O(2$-chloro-4-t-amylphenyl) | Cu |
| (I-16) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$-$SO_2(CH_2)_2CO_2C_4H_9$-i | Pd |
| (I-17) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$-$SO_2$(cyclohexyl) | Cu |
| (I-18) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$-$SO_2\{4$-(2-s-butoxy-benzoylamino)phenyl$\}$ | Ni |
| (I-19) | $R^{\alpha 1}/R^{\alpha 2}, R^{\alpha 3}/R^{\alpha 4}, R^{\alpha 5}/R^{\alpha 6}$-$SO_2(2,6$-dichloro-4-methoxyphenyl) | Pd |
| (I-20) | $R^{\alpha 1}/R^{\alpha 2}, R^{\alpha 3}/R^{\alpha 4}, R^{\alpha 5}/R^{\alpha 6}$-$SO_2CH(Me)CO_2CH_2$-$CH(C_2H_5)C_4H_9$-n | Mg |
| (I-21) | $R^{\alpha 1}/R^{\alpha 2}, R^{\alpha 3}/R^{\alpha 4}, R^{\alpha 5}/R^{\alpha 6}$-$SO_2\{2$-(2-ethoxyethoxy)-phenyl$\}$ $R^{\beta 1}/R^{\beta 2}, R^{\beta 3}/R^{\beta 4}, R^{\beta 5}/R^{\beta 6}, R^{\beta 7}/R^{\beta 8}$-$C_2H_5$ | Zn |
| (I-22) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$-$SO_2N(CH_2CH_2OMe)_2$ | Cu |
| (I-23) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$-$OCH_2CH(C_2H_5)C_4H_9$-n | Ni |
| (I-24) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$-$OCHMe$(phenyl) | Zn |
| (I-25) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$-$OCH($s-butyl$)_2$ | Cu |
| (I-26) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$-$OCH_2CH_2OC_3H_7$-i | $SiCl_2$ |

TABLE 2-continued

| No. | Substitution Positions and Substituents | M |
|---|---|---|
| (I-27) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$-t-amyl $R^{\beta 1}/R^{\beta 2}, R^{\beta 3}/R^{\beta 4}, R^{\beta 5}/R^{\beta 6}, R^{\beta 7}/R^{\beta 8}$-Cl | Ni |

TABLE 3

| No. | Substitution Positions and Substituents | M |
|---|---|---|
| (I-28) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$-(2,6-di-ethoxyphenyl) | Zn |
| (I-29) | $R^{\alpha 1}/R^{\alpha 2}, R^{\alpha 3}/R^{\alpha 4}, R^{\alpha 5}/R^{\alpha 6}$-$SO_2NHCH_2CH_2OC_3H_7$-i $R^{\alpha 7}/R^{\alpha 8}$-$SO_2H$ | Cu |
| (I-30) | $R^{\alpha 1}/R^{\alpha 2}, R^{\alpha 3}/R^{\alpha 4}, R^{\alpha 5}/R^{\alpha 6}$-$CO_2CH_2CH_2OC_2H_5$ $R^{\alpha 7}/R^{\alpha 8}$-$CO_2H$ | Cu |
| (I-31) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$-$CO_2CH(Me)CO_2C_3H_7$-i | Co |
| (I-32) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$-$CONHCH_2CH_2OC_3H_7$-i | Cu |
| (I-33) | $R^{\alpha 1}/R^{\alpha 2}, R^{\alpha 3}/R^{\alpha 4}, R^{\alpha 5}/R^{\alpha 6}$-$CON(CH_2CH_2OC_4H_9$-n$)_2$ $R^{\alpha 7}/R^{\alpha 8}$-$CO_2H$ | Pd |
| (I-34) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$-$NHCOCH(C_2H_6)C_4H_9$-n | Co |
| (I-35) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$-$NHCO(2$-n-butoxycarbonyl-phenyl) | Mg |
| (I-36) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$-$NHSO_2(2$-i-propoxyphenyl) | Pd |
| (I-37) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$-$NHSO_2(2$-n-butoxy-5-t-amyl-phenyl) | Zn |

TABLE 4

| No. | Substitution Positions and Substituents | M |
|---|---|---|
| (I-38) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$-$SO_2CH_3$ | Ni |
| (I-39) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$-$SO_2CH(CH_3)_2$ | Cu |
| (I-40) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$-$SO_2C_4H_9$-s | Cu |
| (I-41) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$-$SO_2CH_2CO_2CH(CH_3)_2$ | Zn |
| (I-42) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$-$SO_2CH(CH_3)CO_2CH_3$ | Cu |
| (I-43) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$-$SO_2C_4H_5$ | Cu |
| (I-44) | $R^{\beta 1}/R^{\beta 2}, R^{\beta 3}/R^{\beta 4}, R^{\beta 5}/R^{\beta 6}, R^{\beta 7}/R^{\beta 8}$-$SO_2N(C_5H_{11}$-i$)_2$ | Cu |
| (I-45) | $R^{\beta 1}/R^{\beta 2}, R^{\beta 3}/R^{\beta 4}, R^{\beta 5}/R^{\beta 6}, R^{\beta 7}/R^{\beta 8}$-$SO_2CH(CH_3)_2$ | Cu |
| (I-46) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$-$SO_2CH_2C_6H_5$ | Cu |

I-38

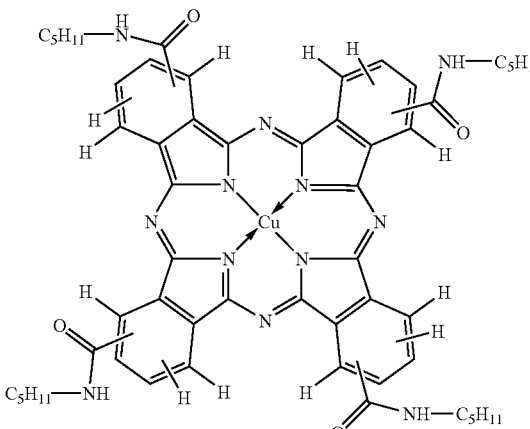

I-39

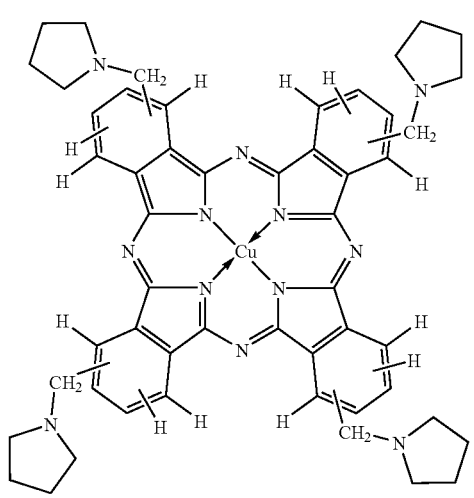

The recording layer is formed by preparing a recording layer coating solution by dissolving a recording substance such as the above-mentioned dye (organic substance) together with a binder, etc. in a suitable solvent, applying the recording layer coating solution to the reflective layer formed on the substrate surface to form a coating layer, and drying the coating layer. The concentration of the recording substance in the recording layer coating solution is normally in the range of 0.01 to 15% by mass, preferably in the range of 0.1 to 10% by mass, more preferably in the range of 0.5 to 5% by mass, and most preferably in the range of 0.5 to 3% by mass.

As the method for dissolving the recording substance and others, methods such as an ultrasonic treatment, a homogenizer treatment, heating, etc. can be employed.

Examples of the solvent for preparing the recording layer coating solution include esters such as butyl acetate, methyl lactate, ethyl lactate, and cellosolve acetate; ketones such as methyl ethyl ketone, cyclohexanone, and methyl isobutyl ketone; chlorinated hydrocarbons such as dichloromethane, 1,2-dichloroethane, and chloroform; amides such as dimethylformamide; hydrocarbons such as methylcyclohexane; ethers such as tetrahydrofuran, ethyl ether, and dioxane; alcohols such as ethanol, n-propanol, isopropanol, n-butanol, and diacetone alcohol; fluorine-based solvents such as 2,2,3,3-tetrafluoropropanol; and glycol ethers such as ethylene glycol monomethyl ether, ethylene glycol monoethyl ether, and propylene glycol monomethyl ether.

These solvents may be used singly or in combinations of two or more by taking into consideration the solubility of the recording substance to be used. Further, according to purposes, the coating solution may contain additives such as an antioxidant, a UV absorber, a plasticizer, and a lubricating agent.

If a binder is used, examples of the binder include naturally occurring organic polymeric substances such as gelatin, cellulose derivatives, dextran, rosin, and rubber; hydrocarbon-based resins such as polyethylene, polypropylene, polystyrene, and polyisobutylene; vinyl-based resins such as polyvinyl chloride, polyvinylidene chloride, and vinyl chloride/vinyl acetate copolymers; acrylic resins such as polymethyl acrylate and polymethyl methacrylate; and synthetic organic polymers such as polyvinyl alcohol, chlorinated polyethylene, epoxy resins, butyral resins, rubber derivatives, and initial-stage condensation products of heat-curable resins such as phenol/formaldehyde resins. If the binder is used as a material for the recording layer, the amount of the binder to be used is normally in the range of 0.01 to 50 times (by mass ratio), preferably in the range of 0.1 to 5 times (by mass ratio), relative to the recording substance. The concentration of the recording substance in the coating solution thus prepared is normally in the range of 0.01 to 10% by mass and preferably in the range of 0.1 to 5% by mass.

Examples of the method for applying the coating solution to the substrate include spraying, spin coating, dip coating, roll coating, blade coating, doctor roll coating, and screen printing. The recording layer may be composed of a single layer or of plural layers. The layer thickness of the recording layer is normally in the range of 20 to 500 nm, preferably An the range of 30 to 300 nm, and more preferably in the range of 50 to 100 nm.

As to the coating temperature, although no problem will occur if it is in the range of 23 to 50° C., it is preferably in the range of 24 to 40° C. and more preferably in the range of 25 to 37° C.

In order to prevent the warping of the disk, the irradiation of the coating layer with ultraviolet light is carried out preferably by means of a pulse-type light-radiator (preferably a UV radiator). The pulse interval is preferably msec or less and more preferably μsec or less. The light amount of irradiation per pulse is not particularly limited, but it is preferably 3 kW/cm$^2$ or less and more preferably 2 kW/cm$^2$ or less.

The number of repetitions of irradiation is not particularly limited, but it is preferably 20 or less and more preferably 10 or less.

In order to raise the light fastness of the recording layer, the recording layer may contain various kinds of browning inhibitors.

Normally, a singlet oxygen quencher is used as the browning inhibitor. Singlet oxygen quenchers that are already described in publications such as patent specifications can be used as the browning inhibitors.

Specific examples of the quenchers include those described in JP-A Nos. 58-175693, 59-81194, 60-18387, 60-19586, 60-19587. 60-35054, 60-36190, 60-36191, 60-44554, 60-44555, 60-44389, 60-44390, 60-54892, 60-47069, 63-209995, and 4-25492, Japanese Patent Application Publication (JP-B) Nos.1-38680 and 6-26028, German Patent No.350399, Journal of the Chemical Society of Japan, No.10 (1992), p.1141, etc.

The amount of the browning inhibitor such as a singlet oxygen quencher to be used is normally in the range of 0.1 to 50% by mass. preferably in the range of 0.5 to 45% by mass, more preferably in the range of 3 to 40% by mass, and particularly preferably in the range of 5 to 25% by mass, based on the amount of the compound to be used for recording.

Interlayer:

The interlayer is formed between the recording layer described above and an adhesive layer that will be described later. If the adhesive layer is formed on the recording layer, the adhesive in the adhesive layer dissolves the organic substance in the recording layer. However, if an interlayer is provided, the interlayer does not allow the adhesive to come into direct contact with the recording layer and thus prevents the recording layer from being dissolved by the adhesive. According to the invention, the thickness of the interlayer is within the range of 1 to than 9 nm. If the thickness of the interlayer is less 1 nm, the interlayer does not fill the role of interlayer because the adhesive penetrates into the recording layer. On the other hand, if the thickness of the interlayer exceeds 9 nm, the laser light transmittance drops to an extent that the reflectance is reduced.

The thickness of the interlayer is more preferably within the range of 1 nm to 5 nm, more preferably within a range of 2 to 8 nm, and most preferably within the range of 3 to 7 nm.

Although the material constituting the interlayer is not particularly limited in so far as the material transmits a laser light, the material is preferably a dielectric material. Specific examples of the material include materials made of nitrides, oxides, carbides, and sulfides of Zn, Si, Ti, Te, Sn, No, Ge, etc., i.e., ZnS, $MoO_2$, $GeO_2$, TeO, $SiO_2$, $TiO_2$, ZnO, ZnS—$SiO_2$, and $SnO_2$. Among these materials, ZnS—$SiO_2$ and $SnO_2$ are preferable, and oxides and sulfides are especially preferable.

Adhesive Layer:

The adhesive layer is the layer that is formed for improving the adhesion between the interlayer described above and an cover layer that will be described later.

The material constituting the adhesive layer is preferably a photo-curable resin. Among photo-curable resins, a resin whose coefficient of contraction by curing is small is preferable in order to prevent the warping of the disk. Examples of such photo-curable resin include UV-curable resins (UV-curable adhesives) such as "SD-640" and "D-347" (trade names) manufactured by Dainippon Ink and Chemicals, Incorporated. The thickness of the adhesive layer is preferably in the range of 1 to 1000 μm, more preferably in the range of 5 to 500 μm, and most preferably in the range of 10 to 100 μm, in order to secure the elasticity of the adhesive layer.

Examples of other material constituting the adhesive layer are listed below. This material is a radiation-curable resin, the molecules of which comprise at least two radiation-functional double bonds. Specific examples of the resin include acrylic esters, acrylamides, methacrylic esters, methacrylamides, allyl compounds, vinyl ethers, vinyl esters, etc. Acrylates and methacrylates, which are each at least bifunctional, are preferred compounds.

Specific examples of the bifunctional compounds that can be used are those prepared by the addition of acrylic acid or methacrylic acid to aliphatic diols and represented by ethylene glycol diacrylate, propylene glycol diacrylate, butanediol diacrylate, hexanediol diacrylate, diethylene glycol diacrylate, triethylene glycol diacrylate, tetraethylene glycol diacrylate, neopentyl glycol diacrylate, tripropylene glycol diacrylate, ethylene glycol dimethacrylate, propylene glycol dimethacrylate, butanediol dimethacrylate, hexanediol dimethacrylate, diethylene glycol dimethacrylate, triethylene glycol dimethacrylate, tetraethylene glycol dimethacrylate, neopentyl glycol dimethacrylate, tripropylene glycol dimethacrylate, etc.

Further examples of the compounds that can be used are polyether acrylates and polyether methacrylates prepared by the addition of acrylic acid or methacrylic acid to a polyetherpolyol such as polyethylene glycol, polypropylene glycol, polytetramethylene glycol, or the like; and polyester acrylates and polyester methacrylates prepared by the addition of acrylic acid or methacrylic acid to a polyesterpolyol obtained from a known dibasic acid and a glycol.

Further examples of the compounds that can be used are polyurethane acrylates and polyurethane methacrylates prepared by the addition of acrylic acid or methacrylic acid to a polyurethane obtained from a reaction between a known polyol or diol and a polyisocyanate.

Still further examples of the compounds that can be used are the reaction products prepared by the addition of acrylic acid or methacrylic acid to bisphenol A, bisphenol F, hydrogenated bisphenol A, hydrogenated bisphenol F, or an alkylene oxide adduct thereof; and compounds having a cyclic structure such as an isocyanuric acid alkylene oxide-modified diacrylate, an isocyanuric acid alkylene oxide-modified dimethacrylate, tricyclodecanedimethanol diacrylate, tricyclodecanedimethanol dimethacrylate, etc.

An electron beam and ultraviolet light can be used as the above-mentioned radiation. When ultraviolet light is used, it is necessary to add a photopolymerization initiator to the following compounds. An aromatic ketone is used as the photopolymerization initiator. Although the kind of the aromatic ketone is not particularly limited, a preferred aromatic ketone is one having an absorption coefficient is relatively large at the wavelengths of 254 nm, 313 nm, and 865 nm where bright line spectra are generated by a mercury lamp normally used as a light source of ultraviolet radiation. Typical examples of the aromatic ketone include acetophenone, benzophenone, benzoin ethyl ether, benzyl methyl ketal, benzyl ethyl ketal, benzoin butyl ketone, hydroxydimethyl phenyl ketone, 1-hydroxycyclohexyl phenyl ketone, 2-2-diethoxy acetophenone, Michler's ketone, etc. Various aromatic ketones can be used. The proportion of the aromatic ketone to be incorporated is 0.5 to 20 parts by mass, preferably 2 to 15 parts by mass, and more preferably 3 to 10 parts by mass, based on 100 parts by mass of the compound. Since an ultraviolet light-curable adhesive, which already contains a photopolymerization initiator, is commercially available, such ultraviolet light-curable adhesive may be used. A mercury lamp is used as the ultraviolet light source. As to the mercury lamp, a mercury lamp of 20 to 200 W/cm is used at a speed of 0.3 to 20 m/min. Normally the distance between the substrate and the mercury lamp is preferably 1 to 30 cm.

As to the electron beam accelerator, although a scanning system, a double scanning system, or a curtain beam system can be employed, a curtain beam system is preferable because a large output power is obtained at a relatively inexpensive cost. As to the electron beam characteristics, the acceleration voltage is 100 to 1000 kV and preferably 150 to 300 kV, and the absorbed dose is 0.5 to 20 Mrad and preferably 1 to 10 Mrad. Energy transmission is insufficient if the acceleration voltage is less than 100 kV, whereas energy efficiency is reduced and thus the cost is disadvantageous if the acceleration voltage exceeds 1000 kV.

Cover layer:

The cover layer is formed in order to prevent the penetration of water into the interior of the optical information recording medium. Although the material of the cover layer is not limited in so far as it is transparent, it is preferably polycarbonate, cellulose triacetate, or the like and more preferably a material whose coefficient of moisture absorption at 23° C. and 50% RH is no more than 5%.

The term "tranaparent" means that the material is transparent to an extent that the material transmits the light for recording and reproduction (transmittance: 90% or more).

The cover layer is formed by preparing a coating solution by dissolving a photo-curable resin constituting the adhesive layer in a suitable solvent, applying the coating solution to the recording layer at an appropriate temperature go as to form a coating layer, laminating a cellulose triacetate film (TAC film), which is obtained, for example, by extrusion processing of plastic, onto the coating layer, and curing the coating layer by irradiating the coating layer with light from the laminated TAC film side. As to the TAC film, a TAC film containing an ultraviolet absorbing agent is preferable The thickness of the cover layer is in the range of 0.01 to 0.2 mm, preferably in the range of 0.03 to 0.1 mm, and more preferably in the range of 0.05 to 0.95 mm.

As stated above, a cover layer was provided by bonding a transparent film-like material by means of an adhesive (adhesive layer) in this embodiment. However, the cover layer may be made of the adhesive (adhesive layer) alone.

In the optical information recording medium of this embodiment, a dielectric layer or a light-transmissive layer may be formed between the reflective layer and the recording layer depending on the characteristics of the recording layer. For example, the light-transmissive layer may be provided in order to improve the adhesion of the recording layer, and a dielectric layer may be provided for the purpose of heat release if the recording layer provided is of a phase-transition type.

It is preferable to form the dielectric layer using a material selected from nitrides, oxides, carbides, and sulfides of Zn, Si, Ti, Te, Sn, Mo, Ge, etc. The material may be $ZnS\text{—}SiO_2$ or the like.

As to the light-transmissive layer, any material may be used if the transmittance of the material is 90% or more to a laser wave.

The dielectric layer or the light-transmissive layer may be formed by a conventionally known method. The thickness of the dielectric layer is preferably 1 to 100 nm and the thickness of the light-transmissive layer is preferably 2 to 50 nm.

EXAMPLES

The present invention will be explained in more details by way of examples given below, it being understood that the present invention is not limited to the following examples.

Examples 1 to 9 and Comparative Examples 1 to 2

An injection-molded polycarbonate resin, having a thickness of 1.1 mm and a diameter of 120 mm and having thereon spiral grooves (track pitch: 340 nm, groove depth: 40 nm, groove width: 150 nm) (manufactured by Teijin Limited, trade name "Panlite AD5503"), was used as a substrate. A reflective layer having a thickness of 120 nm was formed by the sputtering of Ag on the groove side surface of the substrate. Meanwhile, a dye coating solution was prepared by mixing an organic substance represented by the following structural formula with methyl lactate such that the concentration of the dye was 3% and thereafter dissolving the dye by irradiating the mixture with ultrasonic waves for 2 hours. The dye coating solution was spin-coated on the reflective layer by varying the number of revolution within the range of 300 to 4000 rpm under a condition of 23° C. and 50% RH. After that, the substrate was annealed at 23° C. and 50% RH for 2 hours and sputtered with $ZnS\text{—}SiO_2$ such that the layer formed by the sputtering gave the thickness specified for Examples and Comparative Examples, respectively, as shown in Table 5. Further, a UV-curable adhesive (manufactured by Dainippon Ink and Chemicals, Incorporated, trade name "SD 640") was spin-coated at a revolution within the range of 100 to 300 rpm. Then, the coating layer was overlapped with a polycarbonate sheet (Pureace, manufactured by Teijin Limited, thickness: 80 μm) and the adhesive was spread over the entire surface by varying the number of revolution within the range of 300 to 4000 rpm. After that, the adhesive was cured by being irradiated with ultraviolet light by means of a UV radiation lamp. In this way, samples of Examples and Comparative Examples were prepared. In the procedures described above, the sample of Comparative Example 1 did not undergo the sputtering with $ZnS\text{—}SiO_2$.

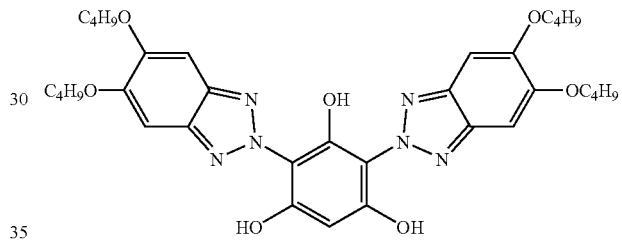

Examples 10 to 18 and Comparative Example 3

An injection-molded polycarbonate resin, having a thickness of 1.1 mm and a diameter of 120 mm and having thereon spiral grooves (track pitch: 340 nm, groove depth: 40 nm, groove width: 150 nm) (manufactured by Teijin Limited, trade name "Panlite AD5503"), was used as a substrate. A reflective layer having a thickness of 120 nm was formed by the sputtering of Ag on the groove side surface of the substrate. Meanwhile, a dye coating solution was prepared by mixing Orazole Blue GN (manufactured by Ciba Fine Chemicals Inc.) with 2,2,3,3-tetrafluoropropanol such that the concentration of the dye was 3% and thereafter dissolving the dye by irradiating the mixture with ultrasonic waves for 2 hours. The dye coating solution was spin-coated on the reflective layer by varying the number of revolution within the range of 300 to 4000 rpm under a condition of 23° C. and 50% RH. After that, the substrate was annealed at 23° C. and 50% RH for 2 hours and sputtered with $SiO_2$ such that the layer formed by the sputtering gave the thickness specified for Examples and Comparative Examples, respectively, as shown in Table 5. In this way, an interlayer was formed. Further, a UV-curable adhesive (manufactured by Dainippon Ink and Chemicals, Incorporated, trade name "SD 640") was spin-coated at a revolution within the range of 100 to 300 rpm. Then, the coating layer was overlapped with a polycarbonate sheet (Pureace, manufactured by Teijin Ltd., thickness: 80 μm) and the adhesive was spread over the entire surface by varying the number of revolution within the range of 300 to 4000 rpm. After that, the adhesive was cured by being irradiated with ultraviolet light by means of a UV radiation lamp. In this way, samples of Examples 10 to 18 and Comparative Example 3 were prepared.

Examples 19 to 27 and Comparative Example 4

An injection-molded polycarbonate resin, having a thickness of 1.1 mm and a diameter of 120 mm and having thereon spiral grooves (track pitch: 340 nm, groove depth: 40 nm, groove width: 150 nm) (manufactured by Teijin Limited, trade name "Panlite AD5503"), was used as a substrate. A reflective layer having a thickness of 90 nm was formed by the sputtering of AgPdCu on the groove side surface of the substrate. Meanwhile, a dye coating solution was prepared by mixing an organic compound represented by the following structural formula with 2,2,3,3-tetrafluoropropanol such that the concentration of the dye was 3% and thereafter dissolving the dye by irradiating the mixture with ultrasonic waves for 2 hours. The dye coating solution was spin-coated on the reflective layer by varying the number of revolution within the range of 300 to 4000 rpm under a condition of 23° C. and 50% RH. After that, the substrate was annealed at [80° C.] for 1 hour and sputtered with ZnS—SiO₂ such that the layer formed by the sputtering gave the thickness specified for Examples and Comparative Examples, respectively, as shown in Table 6. Further, a UV-curable adhesive (manufactured by Dainippon Ink and Chemicals, Incorporated, trade name "SD 640") was spin-coated at a revolution within the range of 100 to 300 rpm. Then, the coating layer was overlapped with a polycarbonate sheet (Pureace, manufactured by Teijin Ltd., thickness: 80 μm) and the adhesive was spread over the entire surface by varying the number of revolution within the range of 300 to 4000 rpm. After that, the adhesive was cured by being irradiated with ultraviolet light by means of a UV radiation lamp. In this way, samples of Examples 19 to 27 and Comparative Example 4 were prepared.

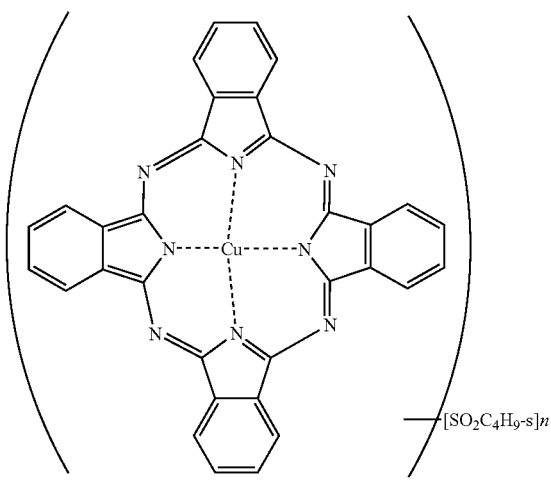

Evaluation:

2T signals were recorded at 6 mW in the optical information recording media of Examples and Comparative Examples by emitting laser using DDU-1000 (trade name, manufactured by Pulse Tec Inc.) at a wavelength of 405 nm through a lens having a lens numerical aperture NA of 0.85. The reflectances and C/N were measured. The results are shown in Table 5.

TABLE 5

| | Thickness of interlayer/nm | Reflectance/% | C/N (dB) |
|---|---|---|---|
| Example 1 | 1 | 23 | 33 |
| Example 2 | 2 | 21 | 36 |
| Example 3 | 3 | 20 | 38 |
| Example 4 | 4 | 19 | 39 |
| Example 5 | 5 | 18 | 40 |
| Example 6 | 6 | 17 | 39 |
| Example 7 | 7 | 15 | 37 |
| Example 8 | 8 | 13 | 35 |
| Example 9 | 9 | 11 | 32 |
| Example 10 | 1 | 31 | 32 |
| Example 11 | 2 | 29 | 34 |
| Example 12 | 3 | 27 | 35 |
| Example 13 | 4 | 25 | 35 |
| Example 14 | 5 | 23 | 36 |
| Example 15 | 6 | 21 | 35 |
| Example 16 | 7 | 19 | 34 |
| Example 17 | 8 | 16 | 32 |
| Example 18 | 9 | 13 | 29 |
| Comparative Example 1 | 0 | Recording impossible | |
| Comparative Example 2 | 10 | 8 | 25 |
| Comparative Example 3 | 10 | 8 | 22 |

TABLE 6

| | Thickness of interlayer/nm | Reflectance/% | C/N (dB) |
|---|---|---|---|
| Example 19 | 1 | 32 | 35 |
| Example 20 | 2 | 35 | 38 |
| Example 21 | 3 | 36 | 40 |
| Example 22 | 4 | 36 | 42 |
| Example 23 | 5 | 35 | 45 |
| Example 24 | 6 | 33 | 43 |
| Example 25 | 7 | 29 | 41 |
| Example 26 | 8 | 25 | 40 |
| Example 27 | 9 | 20 | 35 |
| Comparative Example 4 | 10 | 10 | 23 |

It can be seen from Tables 5 and 6 that each of the optical information recording media of Examples 1 to 27 has an interlayer whose thickness is within the range of 1 to 9 nm and exhibits a high reflectance and a large carrier/noise ratio. On the other hand, no interlayer is provided or the thickness of the Interlayer, when present, is 10 nm in the optical information recording media of comparative Examples 1 to 3. And, the optical information recording media of Comparative Examples 1 to 4 each exhibits a low reflectance and a small carrier/noise ratio.

It was found that the present invention provides an optical information recording medium which exhibits a high reflectance and a large carrier/noise (C/N) ratio and has stable recording and reproduction characteristics.

What is claimed is:

1. An optical information recording medium, comprising:
   a substrate having the following layers disposed thereon in the following order;
   a reflective layer;
   a recording layer;
   an interlayer;
   an adhesive layer; and
   a cover layer, wherein:

recording on and reproduction from the optical information recording medium are carried out by irradiation with a laser light having a wavelength in the range of 380 to 500 nm through a lens having a lens numerical aperture NA of at least 0.7;

the recording layer includes a layer comprising an organic substance and a solvent which enables the recording;

the interlayer comprises a dielectric material;

the thickness of the interlayer is from 1 to 7 nm; and the optical information recording medium after recording has a reflectance at a wavelength of 405 nm of at least 11%.

2. The optical information recording medium according to claim 1, wherein the dielectric material comprises at least one of ZnS, $MoO_2$, $GeO_2$, TeO, $SiO_2$, $TiO_2$, ZnO, ZnS—$SiO_2$, and $SnO_2$.

3. The optical information recording medium according to claim 2, wherein the organic substance comprises at least one of a benzotriazole compound and a phthalocyanine compound.

4. The optical information recording medium according to claim 1, wherein the organic substance comprises at least one of a benzotriazole compound and a phthalocyanine compound.

5. The optical information recording medium according to claim 1, wherein the organic substance comprises a phthalocyanine derivative, a refracting rate of the recording layer to a recording laser light wavelength (n) is at least 1.8 and less than 1.9, and the dielectric material comprises at least one of sulfides and oxides.

6. The optical information recording medium according to claim 1, wherein the substrate is formed from one of polycarbonate and amorphous polyolefin.

7. The optical information recording medium according to claim 1, further comprising an undercoat layer on a side of the substrate surface, on which side the reflective layer will be provided.

8. The optical information recording medium according to claim 7, wherein the thickness of the undercoat layer is in the range of 0.01 to 10 μm.

9. The optical information recording medium according to claim 1, wherein the reflective layer contains any one of Cr, Ni, Pt, Cu, Ag, Au, Al, and stainless steel.

10. The optical information recording medium according to claim 1, wherein the thickness of the reflective layer is in the range of 50 to 200 nm.

11. An optical information recording medium according to claim 1, wherein the adhesive layer comprises one of a photo-curable resin and a resin, the molecules of which include at least two radiation-functional double bonds.

12. The optical information recording medium according to claim 1, wherein the cover layer comprises a material having a coefficient of moisture absorption at 23° C. and 50% RH is no more than 5% or less.

13. The optical information recording medium according to claim 1, further comprising, between the reflective layer and the recording layer, at least one of a dielectric layer and a light-transmissive layer.

14. The optical information recording medium according to claim 13, wherein the thickness of the dielectric layer is in the range of 1 to 100 nm and the thickness of the light-transmissive layer is in the range of 2 to 50 nm.

15. The optical information recording medium according to claim 1, wherein the thickness of the interlayer is from 2 to 7 nm.

16. The optical information recording medium according to claim 1, wherein the thickness of the interlayer is from 3 to 7 nm.

* * * * *